United States Patent [19]
Frutschi

[11] 3,859,795
[45] Jan. 14, 1975

[54] LOAD CONTROL FOR CLOSED CYCLE GAS TURBINE

[75] Inventor: Hansulrich Frutschi, Riniken, Switzerland

[73] Assignee: Brown Boveri-Sulzer Turbomaschinen Aktiengesellschaft, Zurich, Switzerland

[22] Filed: Oct. 1, 1973

[21] Appl. No.: 402,068

[30] Foreign Application Priority Data
Oct. 4, 1972 Switzerland .................... 014465/72

[52] U.S. Cl. .................................................. 60/652
[51] Int. Cl. ......................... F01k 13/02, F01k 3/00
[58] Field of Search ........... 60/102, 105, 107, 59 T, 60/36, 652, 659

[56] References Cited
UNITED STATES PATENTS
3,220,191   11/1965   Berchtold ............................ 60/59 T
3,699,681   10/1972   Frutschi ............................. 60/59 T FOREIGN PATENTS OR APPLICATIONS
862,385   3/1961   Great Britain ...................... 60/59 T Primary Examiner—Martin P. Schwadron
Assistant Examiner—H. Burks, Sr.
Attorney, Agent, or Firm—Robert A. Ostmann

[57] ABSTRACT

Load control arrangement for a closed cycle gas turbine plant which has an endless path of flow for the working medium; a compressor a heater and a turbine are situated in succession to one another in the said path of flow; a storage vessel for a part of the working medium can be connected selectively to two points on the path of flow which are under different pressures to one another; at least the point which is under relatively low pressure is situated between two stages of the compressor.

7 Claims, 3 Drawing Figures

LOAD CONTROL FOR CLOSED CYCLE GAS TURBINE

BACKGROUND OF THE INVENTION

The invention relates to a load control arrangement for a closed cycle gas turbine plant having an endless path of flow for the working medium, a compressor, a heater and a turbine being situated in succession to one another in the said path of flow, and also having a storage vessel for a part of the working medium, which storage vessel is adapted to be connected selectively to two points on the path of flow which are under different pressures to one another.

In a known gas turbine plant of this kind these points in the path of flow to which the storage vessel can be connected are on the one hand situated at a point of maximum working medium pressure and on the other hand at a lowest working medium pressure point. It is then possible, in order to increase the load, to make working medium flow from the storage vessel into the low-pressure part of the endless path of flow until pressure equilibrium is brought about. Correspondingly it is possible, in order to reduce load, to make working medium flow out of the high-pressure part of the endless path of flow into the storage vessel until pressure equilibrium is brought about again. But making working medium flow into the low-pressure part of the endless path of flow to increase load results in the first instance in a considerable decrease in the power of the gas turbine plant, since the compressor receives more load owing to the greater quantity of working medium. Only when the operation of introducing working medium is ended does the desired increase in load gradually come about. The increase in load thus has a so-called negative instantaneous effect. The control behaviour is unstable and is not suitable for frequency support and certainly not for an isolated generating plant.

In another known closed gas turbine plant, the storage vessel for the working medium is connected to a single point on the path of flow, in fact to the part of the path of flow which is under the highest pressure. In this arrangement, the storage vessel must be subjected to a pressure which is substantially higher than the maximum pressure of the working medium situated in the endless path of flow. In this arrangement the introduction of working medium from the storage vessel into the endless path of flow to increase load gives a markedly positive instantaneous effect as regards the load increase. But the storage vessel is under the aforesaid substantially higher pressure, and additional auxiliary compressors of a size suitable for this higher pressure are necessary for filling the storage vessel.

SUMMARY OF THE INVENTION

The invention has as its object in the case of a load control arrangement for a closed cycle gas turbine plant to manage without the relatively high pressure in the storage vessel and without an auxiliary compressor, and yet to obtain a neutral or positive instantaneous effect instead of a negative instantaneous effect.

This object is achieved in the case of the load control arrangement initially described for a closed cycle gas turbine plant having a storage vessel which is adapted to be connected to two flow path points which are under different pressures from one another according to the invention in that at least the point which is under relatively low pressure is situated between two stages of the compressor.

Advantageously, the point which is under relatively high pressure is situated between the compressor and the heater.

If the gas turbine plant comprises a heat exchanger between the portion of the path of flow leading from the turbine to the compressor and the portion of the path of flow leading from the compressor to the heater, it is advantageous for the point subjected to relatively high pressure, to which the storage vessel is adapted to be connected, to be situated between compressor and the heat exchanger.

In gas turbine plants which comprise two separate shafts, at one of which one stage of the turbine and the compressor are situated, and at the other another stage of the turbine and the machine driven by the gas turbine, it is also advantageous if a bypass conduit for the path of flow of the working medium is provided and having an adjustable shutoff device, the said conduit leading from a point in the path of flow situated upstream of the heater to a point on the path of flow situated between two stages of the turbine, the shutoff device being operated briefly in the opening sense at a load increase.

It is also advantageous for load regulation that the compressor does not have any intermediate cooling, or at least an intermediate cooler with a small-volume path of flow for the working medium.

BRIEF DESCRIPTION OF THE DRAWING

Constructional examples of the subject of the invention are shown in a simplified manner in the drawings by means of which the invention will be explained in detail.

DESCRIPTION OF THE PREFERRED EMBODIMENTS

Figure 1:
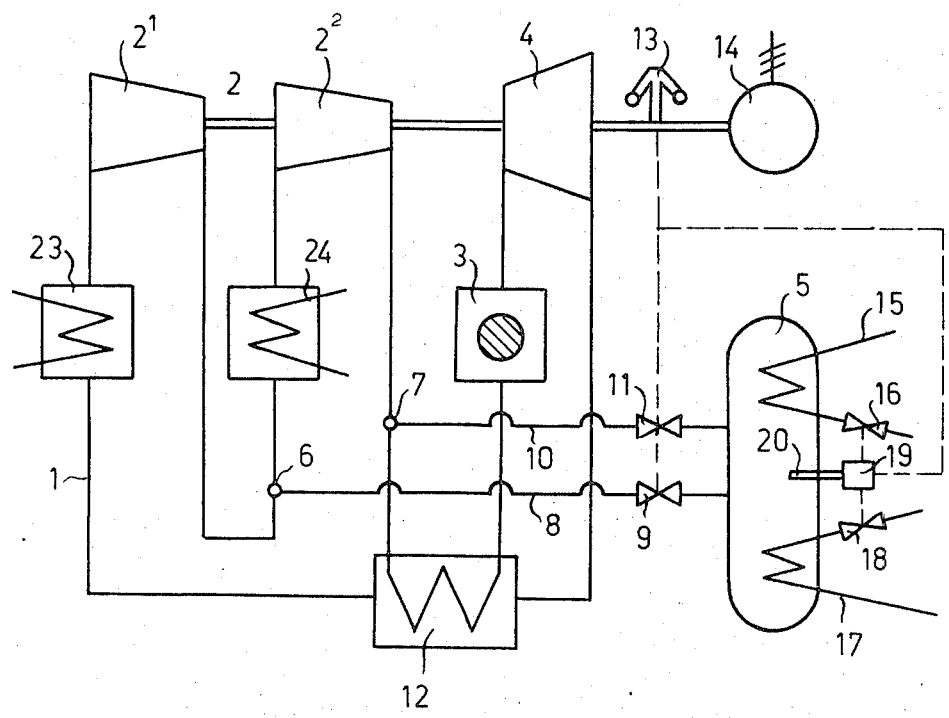
FIG. 1 and 2 show a diagrammatic view in each case of a closed gas turbine plant with the load control arrangement according to the invention.

The gas turbine plant illustrated comprises an endless path of flow 1 for the working medium, in which path of flow 1 a compressor 2, a heater 3 and a turbine 4 are situated in succession to one another in the direction of flow of the working medium. A storage vessel 5 for a part of the working medium is adapted to be connected selectively to two points 6 and 7 on the path of flow 1 which are under different pressures from one another. A conduit 8 with a shutoff device 9 is used for connecting the point 6 to the storage vessel 5, and a conduit 10 with a shutoff device 11 for connecting the point 7 to the storage vessel 5.

According to the invention the point 6 which is under relatively lower pressure than the point 7 is situated between two stages $2^1$ and $2^2$ of the compressor 2.

The point 7 which is under relatively high pressure is situated between the compressor 2 and the heater 3.

The gas turbine plant comprises between the portion of the path of flow 1 leading to the compressor 2 from the turbine 4 and the portion of the path of flow 1 leading from the compressor 2 to the heater 3 a heat exchanger 12, the point 7 which is under higher pressure coming to be situated between the compressor 2 and the heat exchanger 12.

The two valves 9 and 11 are operatively connected to a regulating element 13 of a generator 14 driven by the turbine 4. If the rotational speed of the generator 14 increases owing to a drop in load, the valve 11 is opened by means of the regulating element 13 so that working medium flows through the conduit 10 into the storage vessel 5 from the point 7 of the path of flow 1. When the rotational speed of the generator 14 drops owing to a load increase, the regulating element 13 opens the valve 9 so that working medium flows from the storage vessel 5 to the point 6 of the path of flow 1 through the conduit 8.

Owing to the fact that the point 6 which is under relatively low pressure is situated between two stages of the compressor 2, that is to say between stage $2^1$ and stage $2^2$, the following effect is obtained when there is a load increase in the gas turbine installation. Since the compressors have a flat or shallow power-volume flow characteristic, a load decrease at the stage $2^1$ is produced by a pressure increase brought about at the point 6 of the path of flow 1 by the inflow of working medium, at the pressure side of the stage $2^1$ of the compressor 2. On the other hand owing to the increased quantity of working medium at the point 6 a load increase takes place in stage $2^2$ of the compressor 2. The stages $2^1$ and $2^2$ of the compressor 2, however, are so designed that the load decrease at the stage $2^1$ is equal to or greater than the load increase of the stage $2^2$. In this way at the beginning of allowing working medium into the path of flow 1 there is substantially no load reduction in the gas turbine plant and the load begins to rise in accordance with the quantity of working medium allowed in.

If the pressure ratio of stage $2^1$ of the compressor 2 is selected to be greater than the pressure ratio of the stage $2^2$ of the compressor 2, a positive instantaneous effect can be achieved in a simple manner when there is a load increase in the gas turbine plant.

The point 7 in the constructional example shown in FIG. 1 is situated at the point of highest pressure of working medium in the path of flow 1. But in some circumstances the conduit 10 to the path of flow 1 of the working medium could be connected to a point within the compressor 2 which is situated downstream of the point 6 in the direction of flow of the working medium.

The storage vessel 5 is provided with a cooling device, that is to say with a cooling conduit 15 which comprises a shutoff device 16. The storage device 5 is also provided with a heating device, that is to say a heating conduit 17 which comprises a shutoff device 18. The shutoff devices 16 and 18 are operatively connected with a regulating element 19 connected operatively to the regulating element 13 and comprising a temperature or a pressure sensing element 20 extending into the storage vessel 5.

The regulating element 19 controls the valves 16 and 18 in such a manner that at normal load of the gas turbine plant, that is to say when the shutoff devices 9 and 11 are closed, the pressure of the working medium in the storage vessel 5, rising in accordance with the temperature, remains at a predetermined value which is between the pressures of the points 6 and 7 of the path of flow 1. In this way the load regulating apparatus is fully effective at all times both for load increase and also for load reduction, even if only a small pressure difference has been provided between the points 6 and 7.

Figure 2:
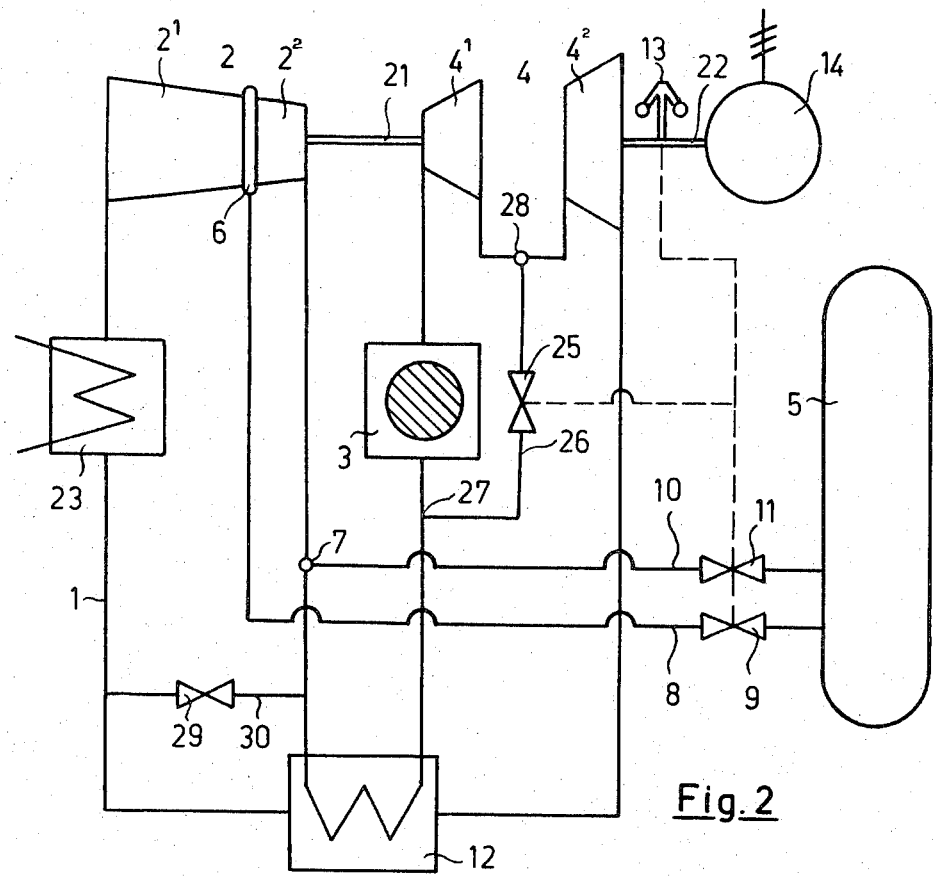

In the constructional example shown in FIG. 2, the gas turbine plant comprises two separate shafts 21 and 22. Arranged on the shaft 21 is a stage $4^1$ which is the high-pressure stage of the turbine 4, and the compressor 2. Arranged at the shaft 22 are the stage $4^2$, that is to say the low-pressure stage of the turbine 4, and the machine driven by the gas turbine, namely the generator 14. In an endless path of flow 1 for the working medium there are situated one after the other in the direction of flow of the working medium the compressor 2, a heat exchanger 12, a heater 3, the turbine 4, the other side of the heat exchanger 12, a cooling device 23 followed by the compressor 2, thus completing the closed circuit for the working medium.

A storage vessel 5 for working medium is adapted to be connected by way of conduits 8 and 10 selectively to two points 6 and 7 in the path of flow 1 which are subjected to different pressures from one another.

Whereas in the constructional example shown in FIG. 1 the point 6 is situated in the portion of the path of flow 1 which leads from stage $2^1$ to stage $2^2$ of the compressor 2 and has an intermediate cooling device 24, in the constructional example shown in FIG. 2 the point 6 is situated directly between two stages of the compressor 2. Since the compressor does not have any intermediate cooling device, the working medium flowing into the path of flow 1 at the point 6 acts without any delay on the stages $2^1$ and $2^2$ of the compressor 2 which are situated upstream of and downstream of the point 6.

Furthermore a bypass conduit 26 provided with an adjustable shutoff device 25 is provided for the path of flow 1 of the working medium. This bypass conduit 26 leads from a point 27 in the path of flow situated between the heat exchanger 12 and the heater 3, that is to say upstream of the heater 3, to a point 28 in the path of flow 1 which is situated between the two stages $4^1$ and $4^2$ of the turbine 4. More particularly for the two-shaft gas turbine shown in FIG. 2, the presence of the bypass conduit 26 is very advantageous. By operating the shutoff device 25, in the opening sense in the case of a load increase, it is possible to improve still further the neutral to positive instantaneous effect on load increase, that is to say when working medium flows from the storage vessel 5 through the conduit 8 into the path of flow 1.

The shutoff device 25 of the bypass conduit 26, but more particularly the shutoff device 9 of the conduit 8 and the shutoff device 11 of the conduit 10, are operatively connected with the regulating element 13 of the gas turbine plant. The regulating element 13 is connected with the shaft 22 of the driven machine, that is to say the generator 14.

In addition, the plant also comprises a return conduit 30 which is provided with a shutoff device 29 and makes it possible for working medium to flow back from the pressure side of the compressor 2 to the suction side of the compressor 2.

Figure 3:
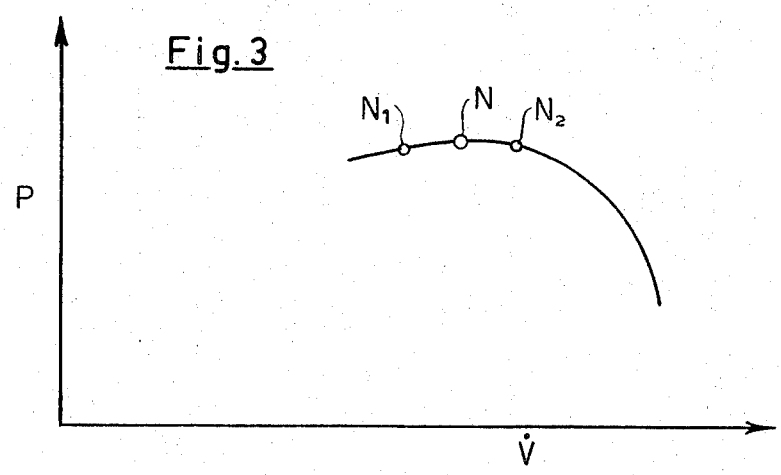
FIG. 3 shows a power-volume flow diagram for compressors.

In the diagram shown in FIG. 3, the power is shown as P, and the volume flow as V. The behaviour of the two stages of the compressor 2 can be easily understood with the help of the power-volume flow characteristic. With normal load, the two compressor stages operate at the point N. With a load increase, that is to say when working medium flows from the storage vessel 5 into the path of flow 1 at the point 6, the stage $2^2$ of the compressor 2 situated at the pressure side of the point 6 substantially receives as much more load as the density of the working medium at its entry increases.

The stage $2^2$ operates at the point on its curve which is designated as $N_2$. At the same time, with load increase, the stage $2^1$ situated upstream at the suction side of the point 6 receives less load; the stage $2^1$ operates at the point of its curve which is designated as $N_1$. The curves of the stage $2^1$ and the stage $2^2$ are so adapted to one another that the load increase of stage $2^2$ is at least compensated by the load decrease of stage $2^1$. But advantageously the load decrease of stage $2^1$ will be made larger than the load increase of stage $2^2$, which can be achieved by giving the stage $2^2$ a steep power-volume flow characteristic, whereas stage $2^1$ retains a shallow power-volume flow characteristic.

I claim:

1. A closed cycle gas turbine plant including an endless flow path which leads working medium in series through a compressor, or heater and a turbine; a storage vessel for a part of the working medium; and means for selectively connecting the storage vessel to two points in said flow path which are under different pressures; and characterized in that at least the lower pressure one of said points to which the selecting means connects the storage vessel is situated between two stages of the compressor.

2. A plant as defined in claim 1 including means, effective when the load on the plant is constant, to maintain the pressure of the working medium in the storage vessel between the pressures at said two points.

3. A plant as defined in claim 1 wherein the compressor is free of any intermediate cooling device.

4. A plant as defined in claim 1 including an intermediate cooling device for the compressor which has a small volume path of flow for the working medium.

5. A plant as defined in claim 1 in which the stages of the compressor are so designed that, when working medium is introduced to said lower pressure point, the resulting load decrease of the compressor stage upstream of said point is at least equal to the resulting load increase of the compressor stage downstream of said point.

6. A plant as defined in claim 1 in which the outlet-inlet pressure ratio of the compressor stage upstream of said lower pressure point is greater than the corresponding ratio for the compressor stage downstream of said point.

7. A plant as defined in claim 1 in which the compressor stage upstream of said lower pressure point has a shallow power-volume flow characteristic, and the compressor stage downstream of said point has a steep power-volume flow characteristic.

* * * * *